(12) United States Patent
Pak

(10) Patent No.: US 12,272,182 B2
(45) Date of Patent: Apr. 8, 2025

(54) METHOD AND SERVER FOR PROVIDING PERSONAL MOBILITY SHARING SERVICE

(71) Applicants: Hyundai Motor Company, Seoul (KR); Kia Corporation, Seoul (KR)

(72) Inventor: Nahyeon Pak, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 581 days.

(21) Appl. No.: 17/585,038

(22) Filed: Jan. 26, 2022

(65) Prior Publication Data

US 2023/0005302 A1 Jan. 5, 2023

(30) Foreign Application Priority Data

Jul. 2, 2021 (KR) .................. 10-2021-0087050

(51) Int. Cl.
*G07C 5/00* (2006.01)
*G07C 5/08* (2006.01)
(52) U.S. Cl.
CPC ........... *G07C 5/008* (2013.01); *G07C 5/0808* (2013.01); *G07C 5/0816* (2013.01); *G07C 5/0841* (2013.01)
(58) Field of Classification Search
CPC .... G07C 5/008; G07C 5/0808; G07C 5/0816; G07C 5/0841; G06F 3/0482; G06N 20/00; G07B 15/02; G07F 17/0057; G06Q 10/04; G06Q 50/40
See application file for complete search history.

(56) References Cited

U.S. PATENT DOCUMENTS

2021/0110356 A1* 4/2021 Hamakubo ............ E05F 15/74

FOREIGN PATENT DOCUMENTS

| KR | 100795979 | B1 |   | 1/2008 |
|---|---|---|---|---|
| KR | 2012-0049671 | A |   | 5/2012 |
| KR | 101683242 | B1 |   | 12/2016 |
| KR | 102148346 | B1 | * | 8/2020 |

* cited by examiner

*Primary Examiner* — Peter D Nolan
*Assistant Examiner* — Demetra R Smith-Stewart
(74) *Attorney, Agent, or Firm* — Fox Rothschild LLP

(57) ABSTRACT

A personal mobility sharing service providing method is implemented by a server for executing the method. The server includes: a communication device configured to communicate with device terminals mounted on personal mobility devices managed by the server and user terminals of users using the personal mobility sharing services; and a control device configured to acquire device state information on the personal mobility devices through the device terminals, acquire use state information of respective users on the personal mobility devices through the user terminals, and when generation of at least one voice of customer (VOC) to a first user is predicted based on the use state information and the device state information, transmit first guide information on the at least one VOC to a first user terminal of the first user.

18 Claims, 13 Drawing Sheets

1

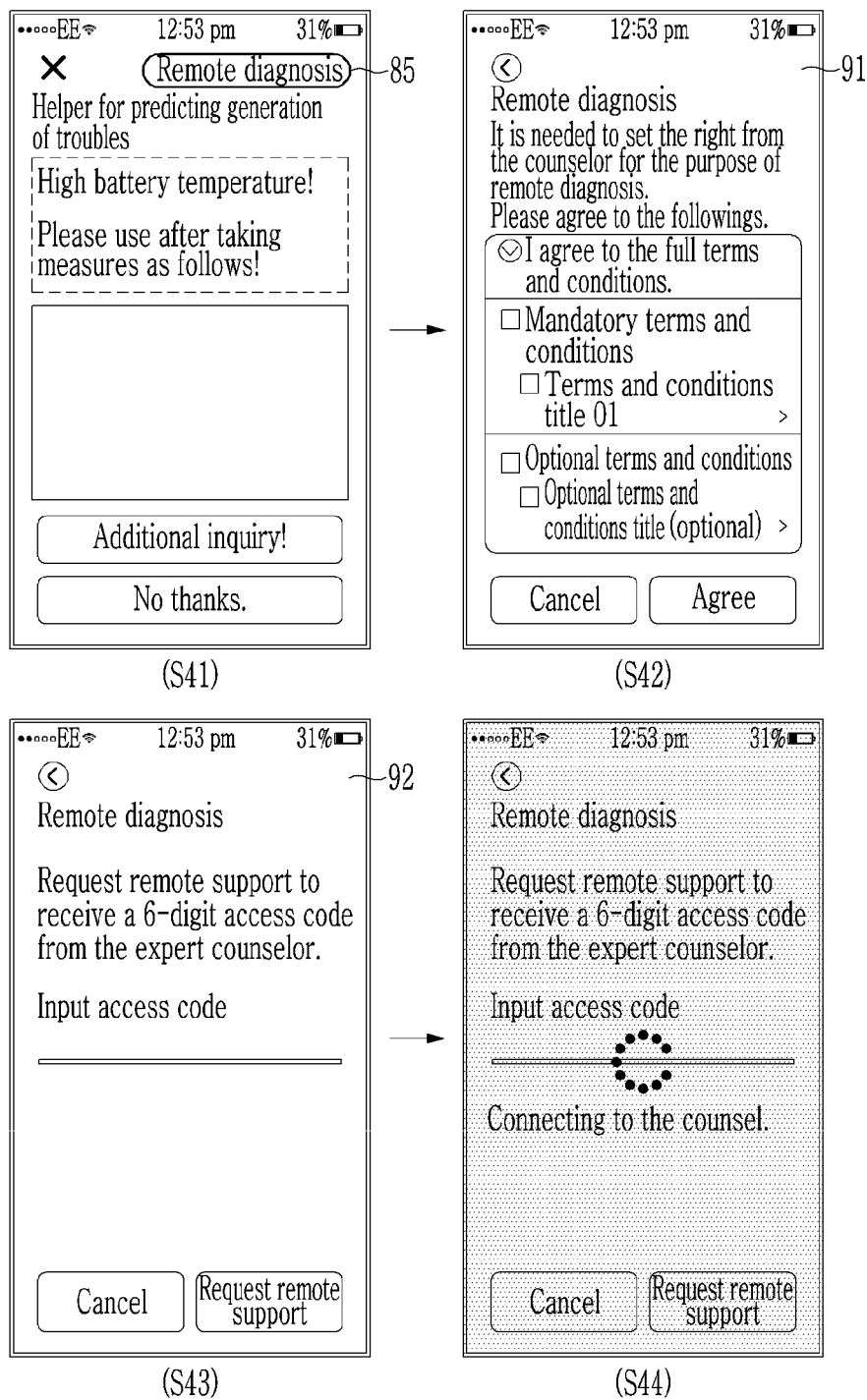

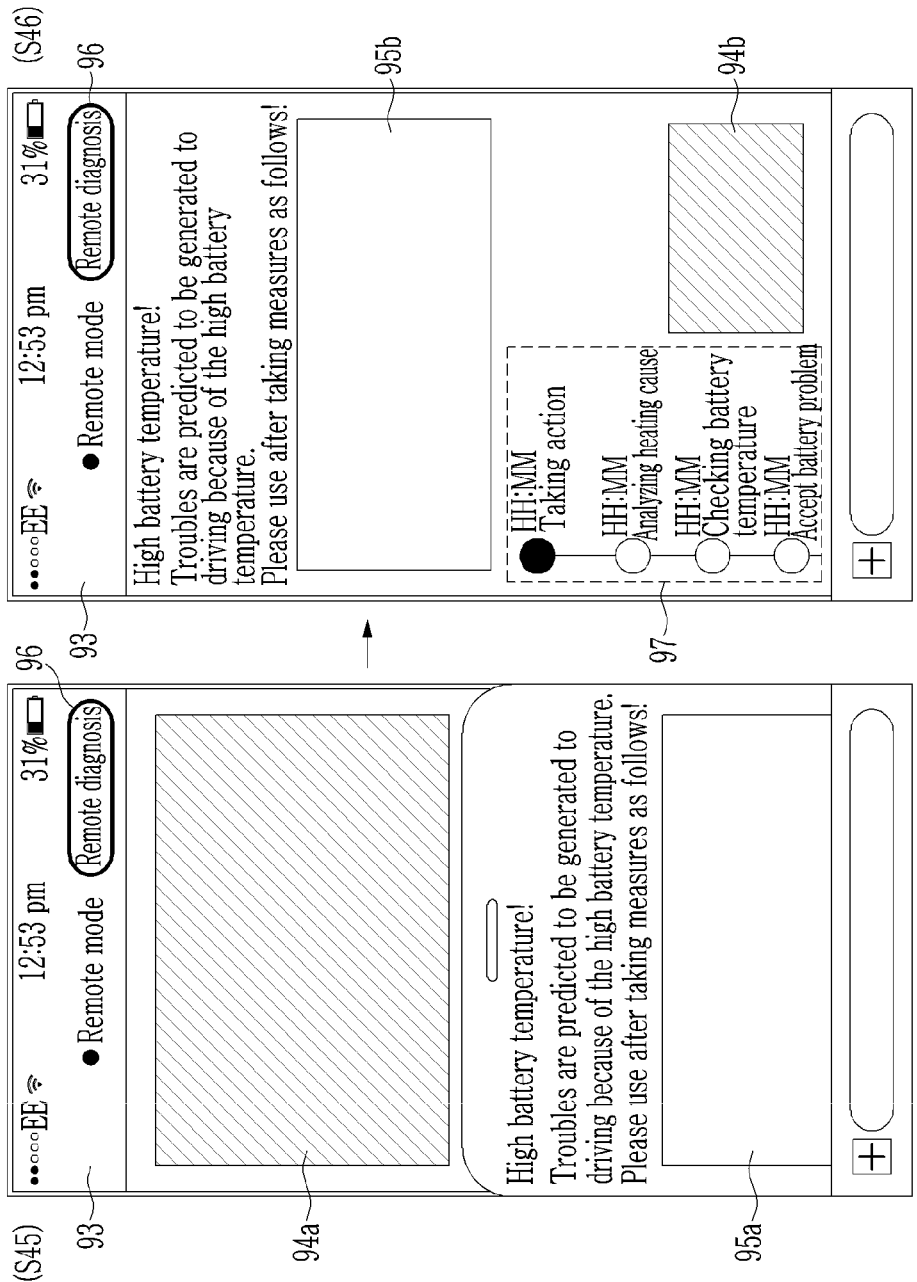

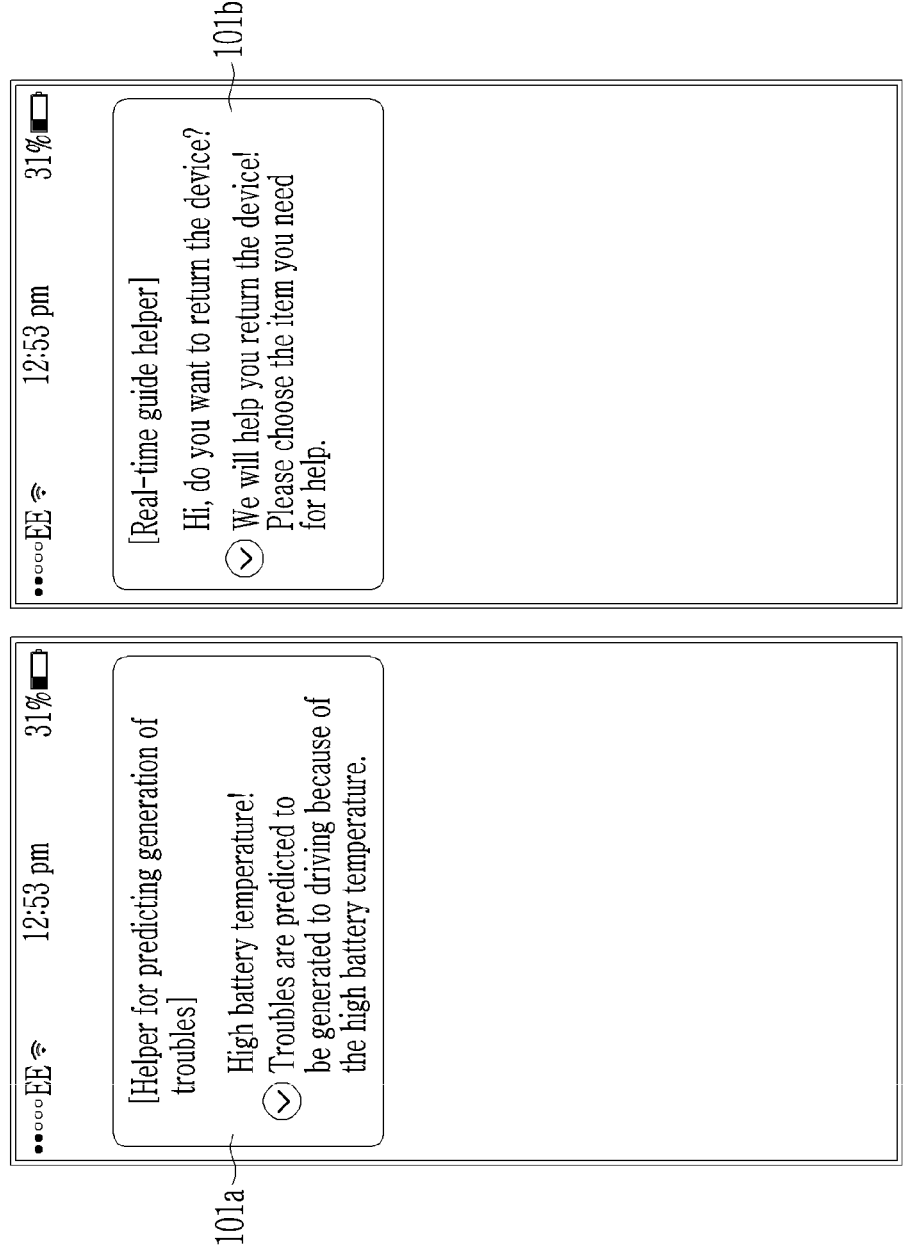

METHOD AND SERVER FOR PROVIDING PERSONAL MOBILITY SHARING SERVICE

CROSS-REFERENCE TO RELATED APPLICATION

This application claims under 35 U.S.C. § 119 the benefit of Korean Patent Application No. 10-2021-0087050 filed in the Korean Intellectual Property Office on Jul. 2, 2021, the entire contents of which are incorporated herein by reference.

BACKGROUND

(a) Technical Field

The present disclosure relates to a method for providing a personal mobility sharing service and a server for executing the same, more particularly, to the method for providing the personal mobility sharing service for addressing user needs or trouble that may occur while a personal mobility sharing service is provided, and a server for executing the same.

(b) Description of the Related Art

A personal mobility (PM) device is a low-speed form of transportation for one or two persons that is driven by electrical energy. Existing personal mobility devices may include electric unicycles, electric scooters, pedal electric bicycles, and very small electric vehicles.

Recently, the use of personal mobility devices is increasing because of convenience of the personal mobility devices. Personal mobility sharing services for a plurality of users to share one personal mobility device are also increasing.

The above information disclosed in this Background section is only for enhancement of understanding of the background of the disclosure, and therefore it may contain information that does not form the prior art that is already known in this country to a person of ordinary skill in the art.

SUMMARY

The present disclosure discloses a method for providing a personal mobility sharing service for addressing user needs or trouble that may occur while a personal mobility sharing service is provided, and a server for executing the same.

An embodiment of the present disclosure provides a server for providing a personal mobility sharing service, including: a communication device configured to communicate with device terminals mounted on personal mobility devices managed by the server and user terminals of users using the personal mobility sharing services; and a control device configured to acquire device state information on the personal mobility devices through the device terminals, acquire use state information of respective users on the personal mobility devices through the user terminals, and when generation of at least one voice of customer (VOC) to a first user is predicted based on the use state information and the device state information, transmit first guide information on the at least one VOC to a first user terminal of the first user.

The first guide information may include the at least one VOC and reply information corresponding to the at least one VOC.

The control device may, when generation of a problem situation relating to a second user is predicted based on the use state information and the device state information, transmit second guide information on the problem situation to a second user terminal of the second user.

The second guide information may include information for providing guidance to solve the problem situation.

When the problem situation corresponds to a device defect of a first personal mobility device rented by the second user, the guide information may include self-diagnosis guide information on the device defect.

The communication device may communicate with a manager terminal of a manager managing the personal mobility devices. The control device may, when generation of a problem situation relating to a device defect of a second personal mobility device managed by the manager is predicted based on the device state information, transmit third guide information including self-diagnosis guide information on the device defect to the manager terminal.

The server may further include a storage device for storing a prediction model for predicting a possibility that a plurality of predefined issues may be generated within a predetermined time. The control device may build the prediction model based on the use state information, the device state information, and service operating information, and may predict a generating possibility of a VOC of the first user by using the prediction model. The service operating information may include at least one of a service region-based normal return rate, a service region-based erroneous return rate, a service region-based robbery rate, a service region-based report rate of generation of trouble of the personal mobility devices, a rental history of the personal mobility devices, a defect occurrence status of the personal mobility devices, or a VOC processing history on the personal mobility sharing service.

The control device may acquire device control history information of the respective personal mobility devices through the device terminals, and may predict a generating possibility of the VOC of the first user by applying the use state information, the device state information, and the device control history to the prediction model. The device control history information may include at least one of a power control history, a locked state controlling history, a speed change history, a motor torque change history, or a use time of a corresponding personal mobility device.

The control device may acquire geographic information corresponding to positions of the respective users based on position information received from the user terminals and the device terminals or distance information between personal mobility devices corresponding to the respective users, and may predict a generating possibility of a VOC of the first user by applying the use state information and the device state information, and the geographic information or the distance information to the prediction model.

The control device may, when transmitting the first guide information and then receiving an additional VOC from the first user terminal, transmit reply information corresponding to the additional VOC to the first user terminal.

The control device may, when transmitting the first guide information and then receiving a request of remote diagnosis from the first user terminal, connect the first user terminal and a counselor terminal of a counselor who will progress remote diagnosis.

At least one sensor may be positioned on the respective personal mobility devices, and the control device may respectively receive the device state information acquired through the at least one sensor from the device terminals. The device state information may include at least one of a voltage, a temperature, and a charged amount of a battery mounted on a corresponding personal mobility device, a temperature, a torque, and an overload of a motor mounted on the corresponding personal mobility device, and a current gear end position, a brake state, or a moving speed of the corresponding personal mobility device.

The use state information may indicate a use state of a corresponding user on a personal mobility device as one of before rental, during driving, during stoppage, before return, or completion of return.

Another embodiment of the present disclosure provides a method for a server for providing a personal mobility sharing service to provide a service, including: acquiring device state information of personal mobility devices through device terminals mounted on the personal mobility devices managed by the server; acquiring use state information of respective users on the personal mobility devices through user terminals of users using the personal mobility sharing service; and when generation of at least one voice of customer (VOC) on a first user is predicted based on the use state information and the device state information, transmitting first guide information on the at least one VOC to a first user terminal of the first user.

The first guide information may include the at least one VOC and reply information corresponding to the at least one VOC.

The method may further include, when generation of a problem situation relating to a second user is predicted based on the use state information and the device state information, transmitting second guide information on the problem situation to a second user terminal of the second user.

The second guide information may include information for providing guidance to solve the problem situation.

When the problem situation corresponds to a device defect of a first personal mobility device rented by the second user, the guide information may include self-diagnosis guide information on the device defect.

The method may further include, when generation of a problem situation relating to a device defect of a second personal mobility device managed by a manager is predicted based on the device state information, transmitting third guide information including self-diagnosis guide information on the device defect to the manager terminal.

The method may further include building a prediction model for predicting generation of a problem situation or a VOC relating to the personal mobility sharing service based on the use state information, the device state information, and service operating information, and predicting a generating possibility of the VOC of the first user by using the prediction model, wherein the service operating information may include at least one of a service region-based normal return rate, a service region-based erroneous return rate, a service region-based robbery rate, and a service region-based report rate of generation of trouble of the personal mobility devices, a rental history of the personal mobility devices, a defect occurrence status of the personal mobility devices, or a VOC processing history relating to the personal mobility sharing service.

The method may further include receiving device control history information including at least one of a power control history, a locked state controlling history, a speed change history, a motor torque change history, and a use time of respective personal mobility devices from the device terminals, wherein the predicting may include predicting a generating possibility of a VOC of the first user by applying the use state information, the device state information, or the device control history to the prediction model.

The method may further include acquiring geographic information corresponding to positions of the respective users based on position information received from the user terminals and the device terminals, or distance information between the respective users and corresponding personal mobility devices. The predicting may include predicting a generating possibility of a VOC of the first user by applying the use state information and the device state information, and the geographic information or the distance information to the prediction model.

The method may further include, after the transmitting of first guide information, receiving an additional VOC from the first user terminal, and transmitting reply information corresponding to the additional VOC to the first user terminal.

The method may further include, after the transmitting of first guide information, receiving a request of remote diagnosis from the first user terminal, and connecting the first user terminal and a counselor terminal of a counselor who will progress remote diagnosis.

The acquiring of device state information may include receiving the device state information acquired by at least one sensor position on respective personal mobility devices from the device terminals. The device state information may include at least one of a voltage, a temperature, and a charged amount of a battery mounted on a corresponding personal mobility device, a temperature, a torque, and an overload of a motor mounted on the corresponding personal mobility device, and a present gear end position, a brake state, or a moving speed of the corresponding personal mobility device.

The use state information may indicate a use state of a personal mobility device of a corresponding user as one of before rental, during driving, during stoppage, before return, or completion of return.

According to the embodiments, the problem situations or the needs of the clients which may be generated while providing the personal mobility sharing service may be efficiently responded to.

BRIEF DESCRIPTION OF THE DRAWINGS

FIG. 9A and FIG. 9B show a method for a management server of a system for providing a personal mobility sharing service according to an embodiment to process a remote diagnosis from a viewpoint of a UI of a client terminal.

FIG. 10 shows examples for a management server of a system for providing a personal mobility sharing service according to an embodiment to provide information on a predicted VOC from a viewpoint of a UI of a terminal.

DETAILED DESCRIPTION OF THE EMBODIMENTS

Figure 1:
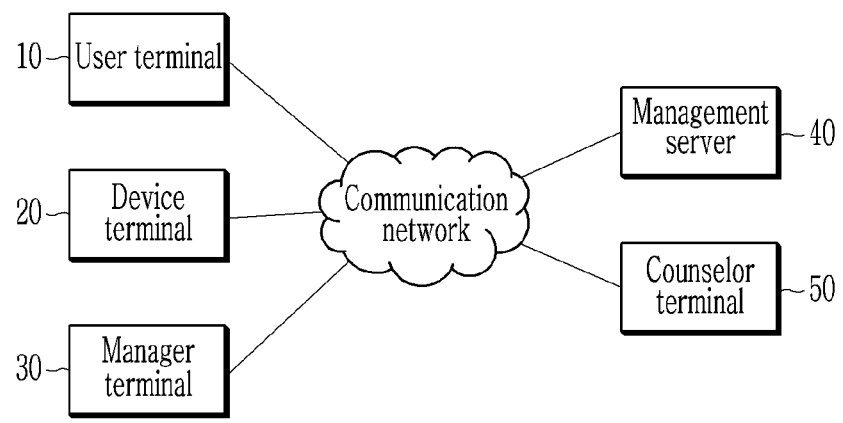
FIG. 1 shows a system for providing a personal mobility sharing service according to an embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example, both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, embodiments disclosed in the present specification will be described in detail with reference to the accompanying drawings. In the present specification, the same or similar components will be denoted by the same or similar reference numerals, and an overlapped description thereof will be omitted.

In describing embodiments of the present specification, when it is determined that a detailed description of the well-known art associated with the present disclosure may obscure the gist of the present disclosure, it will be omitted. The accompanying drawings are provided only in order to allow embodiments disclosed in the present specification to be easily understood and are not to be interpreted as limiting the spirit disclosed in the present specification, and it is to be understood that the present disclosure includes all modifications, equivalents, and substitutions without departing from the scope and spirit of the present disclosure.

Terms including ordinal numbers such as first, second, and the like will be used only to describe various components, and are not to be interpreted as limiting these components. The terms are only used to differentiate one component from others.

It is to be understood that when one component is referred to as being "connected" or "coupled" to another component, it may be connected or coupled directly to another component or be connected or coupled to another component with the other component intervening therebetween. On the other hand, it is to be understood that when one component is referred to as being "connected or coupled directly" to another component, it may be connected or coupled to another component without the other component intervening therebetween.

FIG. 1 shows a system for providing a personal mobility (PM) sharing service according to an embodiment. FIG. 1 shows that a management server 40 is connected to one user terminal 10, one device terminal 20, one manager terminal 30, and one counselor terminal 50 through a communication network, and a number of terminals connected to the management server 40 is not limited thereto. The management server 40 may be connected to a plurality of user terminals 10, a plurality of device terminals 20, a plurality of manager terminals 30, or a plurality of counselor terminals 50.

Referring to FIG. 1, the system 1 for providing a personal mobility sharing service may include a user terminal 10, a device terminal 20, a manager terminal 30, a management server 40, and a counselor terminal 50. The user terminal 10, the device terminal 20, the manager terminal 30, the management server 40, and the counselor terminal 50 may be connected to each other on a communication network in a communicative way.

The user terminal 10 is a terminal of a user using the personal mobility sharing service. The user terminal 10 may be connected to the management server 40 through an application (APP) (hereinafter referred to as a "service application") for a personal mobility sharing service installed in the user terminal 10. Transmission of information between the user terminal 10 and the management server 40 may be performed by the service application executed in the user terminal 10. The user terminal 10 may transmit user information on the user using the user terminal 10, position information, and use state information of the sharable personal mobility device to the management server 40. The user information may include user's proper information such as a name, a birthday, and a telephone number. The position information may include coordinate information, geographic information (a flatland, an uphill road, a downhill road, etc.), and distance information (a short distance or a long distance) to the sharable personal mobility device, which are acquire in real time through the user terminal 10. The use state information represents information on the present condition in which the user is currently using a sharable personal mobility device, and it may include state indicating information such as before rental, during driving, during stoppage, before return, or completion of return, and whether trouble is generated. The user terminal 10 may transmit report information for notifying of generation of trouble (robbery, generation of defects, etc.) to the management server 40 when the trouble is generated to the sharable personal mobility device used by the user.

The user terminal 10 may transmit a request of self-diagnosis to the management server 40 according to the request of the user when a defect (not working, overload, malfunction, etc.) is generated to the sharable personal mobility device rented by the user. At the request of self-diagnosis, the user terminal 10 may transmit detailed information for informing of what kind of defect is generated such as a defect area or a defect type to the management server 40. The user terminal 10 may receive self-diagnosis guide information from the management server 40 as a response to the request of self-diagnosis. The self-diagnosis guide information may include guide information for guiding the user to diagnose the defect of the sharable personal mobility device and solve the same.

When generation of a problem situation relating to the user or a VOC is predicted by the management server 40 in a near future, that is, within a predetermined time, guide information on the problem situation or the VOC that is predicted to be generated may be received. When the generation of a problem situation relating to the user is predicted by the management server 40 within a predetermined time, the guide information may include information (e.g., self-diagnosis guide information) for guiding the problem situation (e.g., a device defect) which is predicted to be generated, and guiding to solve the corresponding problem situation. When the VOC of the user is predicted by the management server 40 within a predetermined time, the guide information may include an item of the VOC predicted to be generated, and corresponding reply information.

When the service application is executed, the user terminal 10 may receive guide information through the corresponding application. In this case, the guide information received from the management server 40 may be displayed on a screen of the user terminal 10 through an application screen of the service application. When the service application is not executed, the user terminal 10 may receive guide information from the management server 40 through an application push (APP push) message of the service application, an instant message (e.g., a Kakao Talk message through the Kakao application) through a messenger application, and a text message. In this case, the user terminal 10 may include at least part (e.g., guide information on the predicted situation) of the guide information in the message, and when the service application is performed by the user, it may further display detailed information through the application screen of the service application.

The user terminal 10 may, after displaying the guide information, transmit a response (e.g., an additional VOC, a postponement of solution, a completion of solution, a remote diagnosis request, etc.) input by the user to the management server 40.

The user terminal 10 may be connected to the counselor terminal 50 through the service application. The user terminal 10 may, when the user requests a remote diagnosis on the sharable personal mobility device in current use, be connected to the counselor terminal 50 through the service application. The user terminal 10 may, when connecting to the counselor terminal 50 for the purpose of a remote diagnosis, share a camera screen (not shown) of the user terminal 10 with the counselor terminal 50. The user terminal 10 may, when connecting to the counselor terminal 50 for the purpose of a remote diagnosis, receive diagnosis information and status of action information.

The device terminal 20 is installed in the sharable personal mobility device. The device terminal 20 may acquire device state information and device control history information through at least one sensor installed in the sharable personal mobility device. The device terminal 20 may transmit the acquired device state information and the device control history information to the management server 40. The device state information may include battery state information and driving state information of the sharable personal mobility device. The battery state information may include state information such as a voltage, a temperature, a charged amount, and an accumulated use time of a battery mounted on the sharable personal mobility device. The driving state information represents state information relating to a driving of the sharable personal mobility device, and may include information on a present position of a gear end, a brake state, a moving speed, and motor states (a temperature, a torque, and a state of whether an overload is provided). The device control history information may include information on power control (on/off) history, a locked state controlling (lock/unlock) history, a speed change history, a motor torque change history, and a use time of the sharable personal mobility device. The device terminal 20 may transmit position information of the sharable personal mobility device collected in real time to the management server 40. The position information of the sharable personal mobility device may include coordinate information acquired in real time through the device terminal 20.

The manager terminal 30 is a terminal of a manager (a field manager) for collecting and managing the sharable personal mobility devices. The manager terminal 30 may be connected to the management server 40 through an application (hereinafter referred to as a "manager application") for managing the sharable personal mobility devices. The manager terminal 30 may be connected to the management server 40, and it may register use histories, use states (before rental, during rental, before return, completion of return, non-return, and robbery), and not-working histories of the sharable personal mobility devices managed by the corresponding manager to the management server 40 and may manage the same. The manager terminal 30 may transmit position information of the manager terminal 30 to the management server 40. The position information may include coordinate information acquired in real time through the manager terminal 30. The manager terminal 30 may transmit report information for notifying of generation of trouble, such as robbery, non-return, and generation of defects, of the sharable personal mobility device to the management server 40.

The manager terminal 30 may, when a defect is generated to the sharable personal mobility device managed by the manager, transmit a request of self-diagnosis to the management server 40 according to a request by the manager. The manager terminal 30 may transmit detailed information for notifying defects such as a defect area or a defect type to the management server 40 at the request of self-diagnosis. The manager terminal 30 may receive self-diagnosis guide information from the management server 40 as a response to the request of self-diagnosis. The self-diagnosis guide information may include information for the manager to diagnose and solve defects generated to the sharable personal mobility device. The manager terminal 30 may display the self-diagnosis guide information received from the management server 40 on the screen of the manager terminal 30. The manager terminal 30 may, after displaying the self-diagnosis guide information, transmit a response (e.g., additional matters for inquiry, a postponement of solution, a completion of solution, termination of diagnosis, and processing details) input by the manager to the management server 40.

The manager terminal 30 may, when the manager requests a remote diagnosis of the sharable personal mobility device, be connected to the counselor terminal 50 through the manager application. The manager terminal 30 may, when connecting to the counselor terminal 50 for the purpose of remote diagnosis, share a camera screen (not shown) of the manager terminal 30 with the counselor terminal 50. The manager terminal 30 may, when connecting to the counselor terminal 50 for the purpose of remote diagnosis, receive diagnosis information and status of action information.

When the management server 40 predicts that a problem situation will be generated to the sharable personal mobility device managed by the manager terminal 30 within a predetermined time, the manager terminal 30 may receive guide information on the predicted problem situation from the management server 40. The guide information may provide guidance on the predicted problem situation (e.g., device defects), and may include information (e.g., self-diagnosis guide information) for guiding to solve the corresponding problem situation.

The manager terminal 30 may, while the management application is executed, receive guide information through a corresponding application. In this case, the guide information received from the management server 40 may be displayed on the screen of the manager terminal 30 through the application screen of the management application. The manager terminal 30 may, when the management application is not executed, receive guide information from the management server 40 through an application push message of the management application, an instant message through a messenger application, or a text message. In this case, the manager terminal 30 may include at least part (e.g., guide information on the predicted problem situation) of the guide information in the message and may display the same, and when the management application is executed by the manager, it may further display detailed information through the application screen of the management application.

The management server 40 may receive user information of respective users, position information, and use state information of the sharable personal mobility device from the user terminals 10 of the users using the personal mobility sharing service. The management server 40 may receive device state information, device control history information, and position information of the respective sharable personal mobility devices from the respective device terminals 20 mounted on the sharable personal mobility devices. The management server 40 may receive position information and report information for notifying of generation of problem situations such as robbery, non-return, or generation of defects of the sharable personal mobility devices from the manager terminal 30.

The management server 40 may generate service operating information of the personal mobility sharing service based on information received from the user terminal 10, the device terminal 20, and the manager terminal 30, and may manage the same. The service operating information may include device operating information and client service providing information of the sharable personal mobility devices managed by the management server 40. The device operating information represents information relating to an operation of the sharable personal mobility devices managed by the management server 40, and may include a service region-based normal return rate, a service region-based erroneous return rate, a service region-based robbery rate, a service region-based report rate of generation of trouble, use/rental history of the sharable personal mobility devices, a defect occurrence status, and self-diagnosis history. The client service providing information may include a VOC processing history (a VOC content and a reply history to the same) relating to a use of the personal mobility sharing service.

The management server 40 may generate a prediction model for predicting a problem situation or generation of a VOC on the respective users using a personal mobility sharing service or the sharable personal mobility device based on information received from the user terminal 10, the device terminal 20, or the manager terminal 30. The prediction model may be generated and updated (or optimized) by using a learning method such as machine learning or deep learning.

The management server 40 may predict in advance a possibility that a problem situation or a VOC is generated to the user or the sharable personal mobility device within a predetermined time according to the present situation of the user, the current location of the user, or the present state of the sharable personal mobility device by use of the above-noted prediction model. The management server 40 may transmit guide information on the problem situation or the VOC predicted to be generated within a predetermined time to the corresponding client terminal (the user terminal 10 or the manager terminal 30). According to the present embodiment, the user or the manager may be referred to as a client of the management server 40, and the user terminal 10 or the manager terminal 30 may be referred to as a client terminal of the management server 40. The management server 40 may, when at least one VOC is predicted to be generated by the client (the user or the manager) within a predetermined time according to the prediction model, transmit guide information on the VOC predicted to be generated by the corresponding client terminal (user terminal 10 or manager terminal 30). The management server 40 may, when a problem situation is predicted to be generated within a predetermined time regarding service use or a device defect, transmit guide information for providing guidance for solving the predicted situation to the client terminal (the user terminal 10 or the manager terminal 30) of the client (the user or the manager) predicted to undergo the corresponding problem situation.

The management server 40 may transmit the above-noted guide information to the corresponding client terminal (the user terminal 10 or the manager terminal 30), and may then receive a response (an additional VOC, a postponement of solution, a completion of solution, a remote diagnosis request, a completion of confirmation, etc.) from the corresponding client terminal. The management server 40 may transmit guide information to the client terminal (the user terminal 10 or the manager terminal 30), and may then receive a remote diagnosis request from the corresponding client terminal. In this case, the management server 40 may connect the client terminal (the user terminal 10 or the manager terminal 30) having requested a remote diagnosis and the counselor terminal 50 so that a remote diagnosis through a counselor may be performed.

The counselor terminal 50 may receive a VOC from the client (the user or the manager) through the client terminal (the user terminal 10 or the manager terminal 30). The counselor terminal 50 may, when reply information on the received VOC is input by the counselor, transmit the input reply information to the corresponding client terminal (the user terminal 10 or the manager terminal 30). The counselor terminal 50 may also transmit reply information on the received VOC to the management server 40. The counselor terminal 50 may, when a remote diagnosis is requested from the client terminal (the user terminal 10 or the manager terminal 30), be connected to the corresponding client terminal for the purpose of a remote diagnosis. The counselor terminal 50 may share image data photographed through a camera (not shown) of the client terminal (the user terminal 10 or the manager terminal 30) having requested a remote diagnosis with the corresponding client terminal at the time of remote diagnosis, or may transmit/receive a message to/from the corresponding client terminal in real time. The counselor terminal 50 may transmit diagnosis information obtained through remote diagnosis and information on a corresponding action history to the client terminal (the user terminal 10 or the manager terminal 30) connected for the purpose of a remote diagnosis. The counselor terminal 50 may, when the remote diagnosis is terminated, transmit remote diagnosis processing history to the management server 40.

The user terminal 10, the device terminal 20, the manager terminal 30, and the management server 40 of FIG. 1 will now be described with reference to FIG. 2 to FIG. 5.

Figure 2:
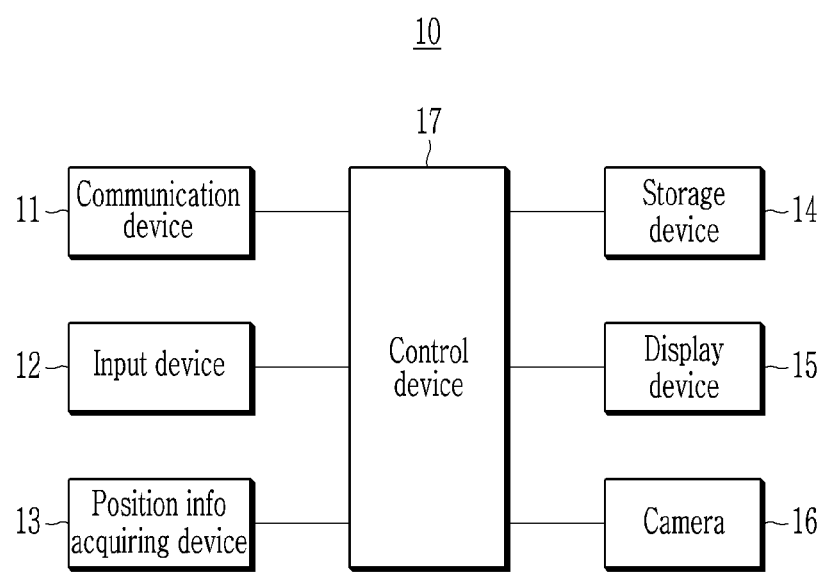
FIG. 2 shows a user terminal of a system for providing a personal mobility sharing service according to an embodiment.

FIG. 2 shows a schematic structure diagram of a user terminal 10 of FIG. 1.

Referring to FIG. 2, the user terminal 10 may include a communication device 11, an input device 12, a position information acquiring device 13, a storage device 14, a display device 15, a camera 16, and a control device 17.

The communication device 11 may be connected to the management server 40 or the counselor terminal 50 through a communication network in a communicative way. The communication device 11 may perform a data transmitting/receiving function between the user terminal 10 and the management server 40 or between the user terminal 10 and the counselor terminal 50.

The input device 12 may receive a user input generated by the user to control an operation of the user terminal 10, and may generate user input data corresponding to the received user input. For example, the input device 12 may receive a request for execution of a service application, a request of self-diagnosis or a remote diagnosis request of the sharable personal mobility device, and the VOC from the user.

The position information acquiring device 13 may acquire, in real time, coordinate information for indicating a current location of the user terminal 10 by using a global positioning system (GPS)/geographic information system (GIS).

The storage device 14 may store a program for an operation of the control device 17, data that are processed or input and output by the user terminal 10, a program for executing the service application, and map information.

The display device 15 may display various types of information processed by the user terminal 10. For example, the display device 15 may display a user interface (UI) or a graphic user interface (GUI) configuring an application screen of the service application.

The camera 16 may acquire image data by processing image signals photographed by an image sensor.

The control device 17 may control an entire operation of the user terminal 10 to perform functions of the user terminal 10.

The control device 17 may execute the service application for using the personal mobility sharing service based on the user input provided through the input device 12.

The control device 17 may acquire user information on the user using the personal mobility sharing service through the user terminal 10. The user information may include proper information of the user including a name, a birthday, and a telephone number. The control device 17 may receive user information through the input device 12 while executing the service application, or may acquire user information from the information stored in the storage device 14.

The control device 17 may acquire position information of the user based on the coordinate information acquired through the position information acquiring device 13. The position information of the user may include coordinate information indicating a current location of the user. The control device 17 may use the coordinate information acquired through the position information acquiring device 13 as position information indicating the current location of the user. The position information of the user may further include geographic information (a flatland, an uphill road, a downhill road, etc.) corresponding to the current location of the user, and distance information (a short distance or a long distance) between the user and the sharable personal mobility device reserved/rented by the user. The control device 17 may additionally acquire geographic information corresponding to the current location of the user from map information stored in the storage device 14 based on the coordinate information indicating the current location of the user. The control device 17 may acquire the distance information between the user and the sharable personal mobility device based on the coordinate information indicating the current location of the user and the coordinate information indicating the current location of the sharable personal mobility device currently reserved/rented by the user. In this case, the coordinate information indicating the current location of the sharable personal mobility device may be received from the management server 40.

The control device 17 may acquire use state information of the sharable personal mobility device. The use state information represents information on the present condition in which the user is using a sharable personal mobility device, and it may include information indicating states such as before rental, during driving, during stoppage, before return, or completion of return, and whether trouble is generated while in use. Here, the state of before rental indicates a state in which the user does not yet receive the sharable personal mobility device after he reserves a rental of the sharable personal mobility device. The state of during driving indicates a state in which the user receives the reserved sharable personal mobility device and is riding the sharable personal mobility device. The state of during stoppage indicates the state in which the user receives the reserved sharable personal mobility device and is stopping the same. The state of before return indicates the state in which the user does not yet return the sharable personal mobility device in current use. The completion of return state indicates the state in which the user returned the sharable personal mobility device. When the user attempts to reserve a sharable personal mobility device, he may execute the service application in the user terminal 10 and may input information needed to a reservation through the input device 12. The information input in this way may be transmitted to the management server 40 through the service application, and reservation information of the sharable personal mobility device may be registered to the management server 40. The user may, after receiving or returning the reserved sharable personal mobility device, input a completion of receiving or a completion of return through the input device 12 while executing the service application. Accordingly, the service application may notify the management server 40 of it that the user completed receiving or returning of the sharable personal mobility device. The service application may continuously receive position information of the sharable personal mobility device currently reserved/rented by the user from the management server 40. Therefore, the control device 17 may monitor the user input provided through the input device 12 while executing the service application, or may monitor information transmitted/received between the management server 40 and the user terminal 10 through the service application to acquire use state information of the user.

The control device 17 may, while the service application is executed, transmit user information and position information to the management server 40 through the communication device 11. The position information transmitted to the management server 40 by the user terminal 10 may include coordinate information indicating the current location of the user terminal 10. The position information transmitted to the management server 40 by the user terminal 10 may additionally include geographic information corresponding to the current location of the user terminal 10, and distance information to the sharable personal mobility device. The control device 17 may, while the service application is executed, transmit use state information of the user to the management server 40. The use state information may be acquired by the management server 40. In this case, the user terminal 10 may receive use state information from the management server 40, instead of transmitting use state information to the management server 40.

The control device 17 may transmit report information on the trouble generated to the sharable personal mobility device to the management server 40 through the service application.

The control device 17 may transmit a request of self-diagnosis on the sharable personal mobility device to the management server 40 through the service application. In this case, the control device 17 may receive self-diagnosis guide information from the management server 40 as a response to the request of self-diagnosis. The control device 17 may transmit detailed information (a defect area, a defect type, etc.) relating to the defect of the sharable personal mobility device to the management server 40 when requesting a self-diagnosis from the management server 40.

The control device 17 may receive guide information on the problem situation or the VOC predicted to be generated by the management server 40 in the near future from the management server 40. When a generation of the problem situation relating to the user within a predetermined time is predicted by the management server 40, guide information received from the management server 40 may include information (e.g., self-diagnosis guide information) for providing guidance to the problem situation (e.g., the device defect) predicted to be generated and also providing guidance to solve the corresponding problem situation. When the VOC of the user is predicted to be generated within a predetermined time by the management server 40, the guide information received from the management server 40 may include the predicted VOC item and reply information on the same. The control device 17 may, when receiving guide information, display the guide information through the display device 15 to provide the same to the user.

The control device 17 may transmit a request of remote diagnosis on the sharable personal mobility device to the management server 40. The control device 17 may, for the purpose of a remote diagnosis, be connected to the counselor terminal 50. In this case, the control device 17 may share the image data acquired through the camera 16 of the user terminal 10 with the counselor terminal 50. That is, the control device 17 may transmit the image data photographed through the camera 16 to the counselor terminal 50 in real time. The control device 17 may receive diagnosis information and status of action information relating to remote diagnosis from the counselor terminal 50, and may display the same through the display device 15.

Figure 3:
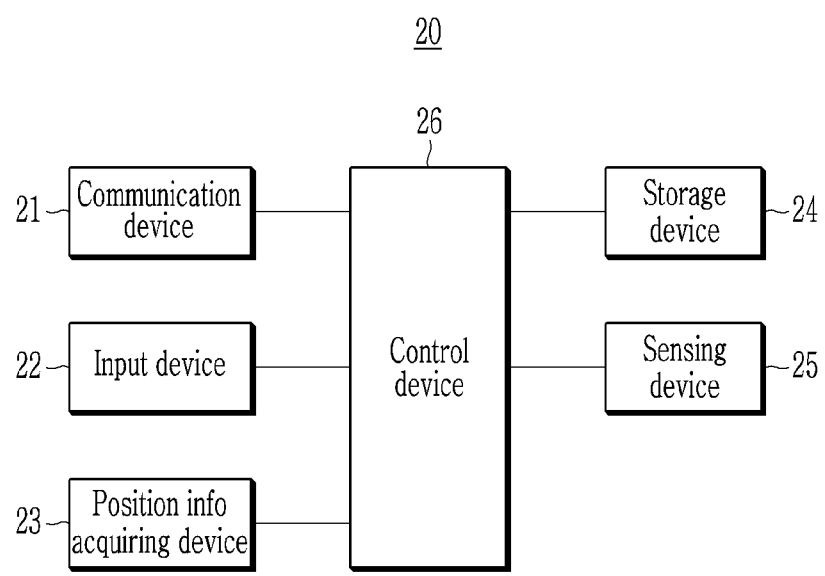
FIG. 3 shows a device terminal of a system for providing a personal mobility sharing service according to an embodiment.

FIG. 3 shows a schematic structure diagram of a device terminal 20 of FIG. 1.

Referring to FIG. 3, the device terminal 20 may include a communication device 21, an input device 22, a position information acquiring device 23, a storage device 24, a sensing device 25, and a control device 26.

The communication device 21 may be connected to the management server 40 through the communication network in a communicative way. The communication device 21 may perform a data transmitting/receiving function between the device terminal 20 and the management server 40.

The input device 22 may receive a user input generated by the user to control operations of the device terminal 20 and the sharable personal mobility device on which the device terminal 20 is mounted, and may generate user input data corresponding to the provided user input.

The position information acquiring device 23 may acquire coordinate information indicating the current location of the device terminal 20 by using the GPS/GIS.

The storage device 24 may store a program for an operation of the control device 26, and data processed, input, or output by the device terminal 20.

The sensing device 25 may include at least one Internet of things (IoT) sensor. The sensing device 25 may include sensors for sensing a voltage, a temperature, and a charging and discharging current of a battery mounted on the sharable personal mobility device. The sensing device 25 may include sensors for sensing a temperature, a torque, and a driving current of a motor mounted on the sharable personal mobility device.

The control device 26 may control a general operation of the device terminal 20 to perform the functions of the device terminal 20.

The control device 26 may acquire device state information (battery state information, driving state information, etc.) and device control history information of the sharable personal mobility device on which the device terminal 20 is mounted based on the user input provided through the input device 21 and information sensed through the sensing device 25. The control device 26 may acquire battery state information such as a voltage, a temperature, a charged amount, and an accumulated use time of the battery based on the information sensed from the battery through the sensing device 25. The control device 26 may acquire driving state information such as a current gear end position, a moving speed, a motor temperature, and whether an overload is applied to the motor based on user inputs (e.g., a gear end manipulating input, a brake manipulating input, etc.) provided through the input device 21, and information sensed from the motor through the sensing device 25.

The control device 26 may acquire device control history information including a power control history, a locking state control history, a speed change history, a motor torque change history, and a use time of the sharable personal mobility device based on the user inputs (a power on/off manipulating input of the sharable personal mobility device, a lock/unlock manipulating input and a moving speed manipulating input of the sharable personal mobility device, etc.) provided through the input device 21.

The control device 26 may acquire position information of the sharable personal mobility device based on the coordinate information acquired through the position information acquiring device 23. The control device 26 may, when the coordinate information indicating the current location of the device terminal 20 is acquired through the position information acquiring device 23, use the coordinate information as position information of the sharable personal mobility device to which the device terminal 20 is attached.

The control device 26 may transmit device state information (battery state information, driving state information, etc.), device control history information, and position information of the sharable personal mobility device to the management server 40.

The control device 26 may perform a self-diagnosis function of the sharable personal mobility device on which the device terminal 20 or the device terminal 20 is mounted. The control device 26 may, after performing the self-diagnosis function, transmit a self-diagnosis result to the management server 40.

Figure 4:
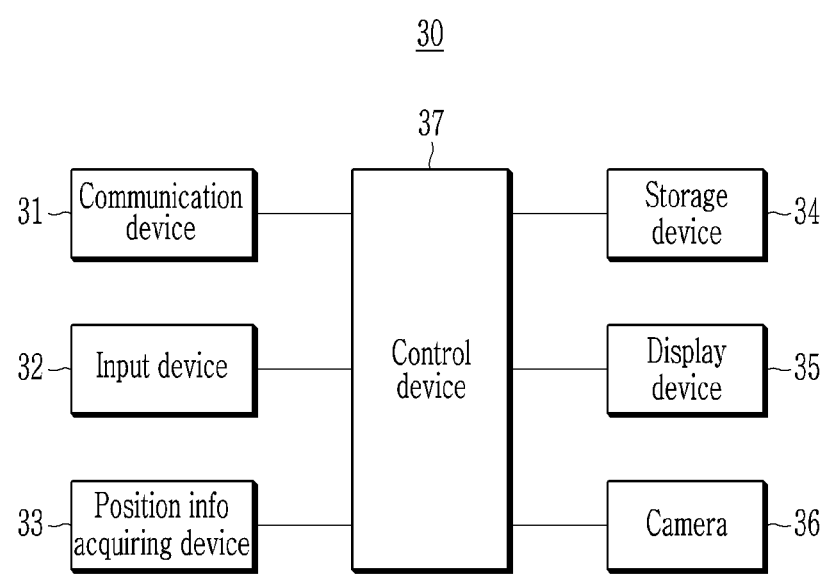
FIG. 4 shows a manager terminal of a system for providing a personal mobility sharing service according to an embodiment.

FIG. 4 shows a schematic structure diagram of a manager terminal 30 of FIG. 1.

Referring to FIG. 4, the manager terminal 30 may include a communication device 31, an input device 32, a storage device 34, a display device 35, a camera 36, and a control device 37.

The communication device 31 may be connected to the management server 40 or the counselor terminal 50 through the communication network in a communicative way. The communication device 31 may perform a data transmitting/receiving function between the manager terminal 30 and the management server 40 or between the manager terminal 30 and the counselor terminal 50.

The input device 32 may receive a user input generated by the manager to control an operation of the manager terminal 30, and may generate user input data corresponding to the provided user input. For example, the input device 32 may receive a request to execute a manager application, a request of self-diagnosis or a remote diagnosis request of the sharable personal mobility device, and the VOC from the manager.

The position information acquiring device 33 may acquire coordinate information indicating the current location of the manager terminal 30 by using the GPS/GIS.

The storage device 34 may store a program for an operation of the control device 37, and data processed, input, or output by the manager terminal 30. For example, the storage device 34 may store a program for performing the manager application.

The display device 35 may display various kinds of information processed by the manager terminal 30. For example, the display device 35 may display the UI or the GUI for configuring the application screen of the manager application.

The camera 36 may process the image signal photographed through the image sensor and may acquire image data.

The control device 37 may control the general operation of the manager terminal 30 to perform the functions of the manager terminal 30.

The control device 37 may, while executing the manager application, receive a use history, use states (before rental, during rental, before return, completion of return, non-return, robbery, etc.), and a no-working history of the sharable personal mobility devices from the management server 40. The control device 37 may display information such as the received use history, the use states, and the not-working history through the application screen of the manager application.

The control device 37 may transmit position information of the manager terminal 30, and report information for notifying generation of defects when the defect (an overload, not working, a malfunction, etc.) are generates to the sharable personal mobility device to the management server 40. The position information of the manager terminal 30 may include coordinate information acquired through the position information acquiring device 33.

The control device 37 may, when transmitting report information, transmit detailed information (a defect area, a defect type, etc.) on the defects, and a defect processed result (repairing, replacement of parts, etc.) to the management server 40. The control device 37 may transmit a request of self-diagnosis on the sharable personal mobility device to the management server 40. In this case, the control device 37 may receive self-diagnosis guide information from the management server 40 as a response to the request of self-diagnosis. The control device 37 may, at the request of self-diagnosis to the management server 40, transmit detailed information (defect areas, defect types, etc.) relating to the defects of the sharable personal mobility device to the management server 40.

The control device 37 may transmit a request of remote diagnosis on the sharable personal mobility device to the management server 40. The control device 37 may, for the purpose of remote diagnosis, connect the manager terminal 30 and the counselor terminal 50 through the communication device 31. The control device 37 may, when connected to the counselor terminal 50 for the purpose of remote diagnosis, share the image data acquired through the camera 36 of the manager terminal 30 with the counselor terminal 50. That is, the control device 37 may transmit the image data photographed through the camera 36 to the counselor terminal 50 connected for the purpose of remote diagnosis in real time. The control device 37 may also receive diagnosis information and status of action information relating to remote diagnosis from the counselor terminal 50, and may display the same through the display device 35.

Figure 5:
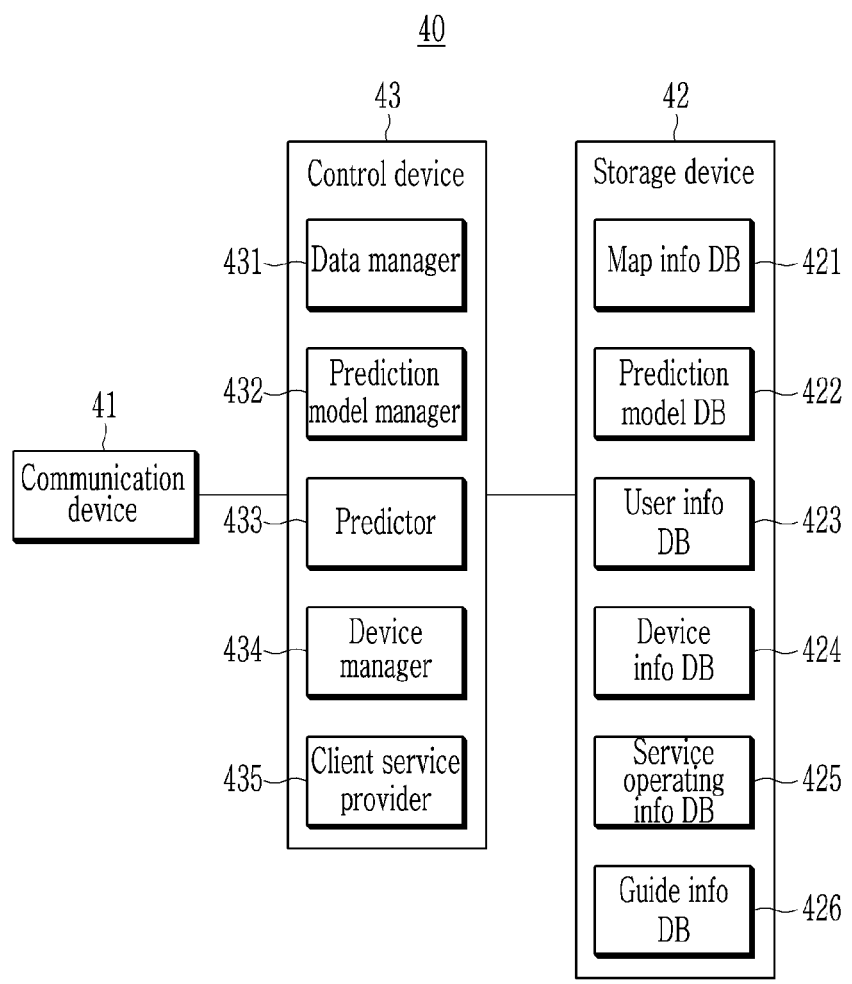
FIG. 5 shows a management server of a system for providing a personal mobility sharing service according to an embodiment.

FIG. 5 shows a schematic structure diagram of a management server 40 of FIG. 1.

Referring to FIG. 5, the management server 40 may include a communication device 41, a storage device 42, and a control device 43.

The communication device 41 may be connected to the user terminal 10, the device terminal 20, the manager terminal 30, or the counselor terminal 50 through the communication network in a communicative way. The communication device 41 may perform a data transmitting/receiving function between the management server 40 and the user terminal 10, between the management server 40 and the device terminal 20, between the management server 40 and the manager terminal 30, or between the management server 40 and the counselor terminal 50.

The storage device 42 may store a program for an operation of the control device 43, and data processed, input, or output by the management server 40. The storage device 42 may include a map information database (DB) 421, a prediction model DB 422, a user information DB 423, a device information DB 424, a service operating information DB 425, and a guide information DB 426.

The map information DB 421 may store map information. The map information represents various types of geographical space information digitized in a digital form, such as geographical positions, topography, features, or names of places. The map information may include gradient information for respective positions as attribute information.

The prediction model DB 422 may store a prediction model for predicting a possibility that a plurality of predefined issues may be generated within a predetermined time. The issues represent issues that need assistance, and may include problem situations and VOCs that are generated in the personal mobility sharing service. That is, the prediction model may predict generation of problem situations or VOCs relating to the personal mobility sharing service. The prediction model DB 422 may store a program for executing the prediction model, and data used for execution of the prediction model.

The user information DB 423 may store information on the users using the personal mobility sharing service. The user information DB 423 may distinguish user information and position information of respective users, and use state information and report information of the sharable personal mobility device for the respective users, and may store the same. The user information DB 423 may distinguish service use history information of respective users, VOC processing present condition information, self-diagnosis history information, and remote diagnosis history information for respective users and may store the same. The user information may include proper information of users such as names, birthdays, and telephones. The position information of users may include current locations of users, that is, coordinate information indicating the current location of the user terminal 10. The position information of users may additionally include geographic information (a flatland, an uphill road, a downhill road, etc.) corresponding to the position of the user, and distance information (short distance or long distance) between a user and the sharable personal mobility device reserved/rented by the user. The position information of users may additionally include degrees of congestion at a place corresponding to the position of the user. The use state information of the sharable personal mobility device of the user represents information on the present condition in which the user is currently using the sharable personal mobility device, and may include information for indicating states such as before rental, during driving, during stoppage, before return, and completion of return, and whether trouble is generated. The service use history information of the user may include information on the history for the respective users to use the personal mobility sharing service. The VOC processing present condition information of users may include the VOCs received from the users and guide information corresponding to the VOCs relating to the personal mobility sharing service. The self-diagnosis history information of users may include information on a request history of self-diagnosis of the users received through the user terminal 10 and a processed history thereon. The remote diagnosis history information of users may include information on a request history of remote diagnosis of users received through the user terminal 10 and a processed history thereon.

The device information DB 424 may distinguish information on the sharable personal mobility devices managed by the management server 40 for respective sharable personal mobility devices, and may store the same. The device information DB 424 may distinguish battery state information, driving state information, device control history information, and position information for the respective sharable personal mobility devices, and may store the same. The device information DB 424 may distinguish defect history information and self-diagnosis history information for the respective sharable personal mobility devices, and may store the same. The battery state information may include state information such as a voltage, a temperature, a charged amount, and an accumulated use time of the battery mounted on the respective sharable personal mobility devices. The driving state information may include information on driving states of the sharable personal mobility device, such as a present gear end position, a brake state, a moving speed, and motor states (a temperature, a torque, and whether an overload is applied). The device control history information may include information on a power control history, a locking state control history, a speed change history, a motor torque change history, and a use time of the sharable personal mobility device. The position information of the sharable personal mobility device may include coordinate information and geographic information (a flatland, an uphill road, a downhill road, etc.) corresponding to the current location of the sharable personal mobility device. The defect history information may include information on a not-working history generated to the respective sharable personal mobility devices, and a processing history (repairing, exchanges of parts, discarding, etc.) thereon. The self-diagnosis history information may include information on a self-diagnosis history of respective sharable personal mobility devices, and a corresponding processing history (providing of self-diagnosis guide information, etc.).

The service operating information DB 425 may include information on a service operation of the personal mobility sharing service. The service operating information DB 425 may distinguish device operating information and client service providing information of the sharable personal mobility devices managed by the management server 40 for respective sharable personal mobility devices, and may store the same. The service operating information may include device operating information and client service providing information of the sharable personal mobility devices managed by the management server 40. The device operating information may include a service region-based normal return rate, a service region-based erroneous return rate, a service region-based robbery rate, a service region-based report rate of generation of trouble of the sharable personal mobility devices managed by the management server 40, a use/rental history, a defect occurrence status, and an self-diagnosis history of the sharable personal mobility devices. The client service providing information may include a VOC processing history (a VOC content and a reply history thereon) relating to a use of the personal mobility sharing service.

The guide information DB 426 may distinguish guide information to be transmitted to the client terminal (the user terminal 10 or the manager terminal 30) for respective issues and may store the same, regarding the issues (problem situations or VOCs) for predicting a generating possibility through the prediction model. The guide information DB 426 may map the problem situations (e.g., device defects) that may be generated while providing the personal mobility sharing service and guide information corresponding to the respective problem situations, and may store mapped results. The guide information DB 426 may map the VOC items that may be generated while providing the personal mobility sharing service and guide information corresponding to the respective VOC items, and may store mapped results.

The control device 43 may control the general operation of the management server 40 to execute the functions of the management server 40. The control device 43 may include a data manager 431, a prediction model manager 432, a predictor 433, a device manager 434, and a client service provider 435.

The data manager 431 may store information received from the user terminal 10, the device terminal 20, the manager terminal 30, and the counselor terminal 50, and information stored in the storage device 42, and may manage the same.

The data manager 431 may acquire user information and position information of users, and use state information, service use history information, VOC processing present condition information, and self-diagnosis processing present condition information of the sharable personal mobility device, and may store the information in the user information DB 423.

The data processor 431 may acquire user information and position information of users based on the information received from the user terminals 10 of the respective users. When the position information received from the user terminal 10 includes coordinate information indicating the current location of the user, the data processor 431 may acquire geographic information (a flatland, an uphill road, a downhill road, etc.) corresponding to the current locations of the respective users from map information based on the received coordinate information. The data processor 431 may acquire distance information between the user and the sharable personal mobility device based on the coordinate information received from the user terminal 10 and the coordinate information indicating the current location of the sharable personal mobility device reserved/rented by the user. The data processor 431 may acquire the degree of congestion of the place where the user is positioned from the map information based on the coordinate information received from the user terminal 10.

The data processor 431 may acquire use state information of the sharable personal mobility devices of respective users based on the information received from the user terminals 10. The data processor 431 may acquire use state information by monitoring the use states of the sharable personal mobility devices of respective users based on reservation information, completion of receiving information, completion of return information of the sharable personal mobility devices received from the respective user terminals 10, and position information and moving speeds of the sharable personal mobility devices received from the respective device terminals 20.

The data processor 431 may acquire service use history information of respective users based on reservation information, completion of receiving information, and completion of return information of the sharable personal mobility devices received from the respective user terminals 10. The data processor 431 may acquire VOC processing present condition information of respective users by collecting the VOCs of users received to the management server 40 or the counselor terminal 50 and reply information thereto. The data processor 431 may acquire self-diagnosis processing present condition information of respective users by collecting the requests of self-diagnosis received from the respective user terminals 10 and response information (self-diagnosis guide information) thereto.

The information of users collected in this way may be used for the predictor 433 to be described to determine the current situations (before rental, during driving, during stoppage, before return, completion of return, generation of trouble, etc.) and the current locations of respective users, and predict the possibility that the problem situation or the VOC may be generated.

The data processor 431 may acquire battery state information, driving state information, device control history information, defect history information, and self-diagnosis history information of the respective sharable personal mobility devices, and may store the information in the device information DB 424.

The data processor 431 may receive battery state information, driving state information, and device control history information of the respective sharable personal mobility devices from the device terminals 20. When the position information of the sharable personal mobility device acquired from the device terminal 20 includes coordinate information, the data processor 431 may acquire geographic information (a flatland, an uphill road, a downhill road, etc.) corresponding to the current location of the sharable personal mobility device from the map information based on the received coordinate information.

The data processor 431 may receive information (a defect area, a defect type, a defect processing present condition, etc.) on the generation of defects of the sharable personal mobility devices from the user terminal 10 or the manager terminals 30, and may acquire defect history information of the respective sharable personal mobility devices. The data processor 431 may acquire self-diagnosis history information of the respective sharable personal mobility devices based on the history in which the user terminals 10 or the manager terminals 30 request self-diagnosis on the respective sharable personal mobility devices and response information (self-diagnosis guide information) thereto.

The data processor 431 may acquire service operating information including device operating information and client service providing information of the sharable personal mobility devices managed by the management server 40, and may store the same in the service operating information DB 425.

The information of the sharable personal mobility devices acquired in this way may be used for the predictor 433 to find battery lifespans and motor states of the respective sharable personal mobility devices and predict the possibility that the problem situations such as device defects may be generated.

The management server 40 may set service regions in which the personal mobility sharing service is used, and may manage the same. The sharable personal mobility devices managed by the management server 40 may be rented and returned in the predetermined service regions. The data processor 431 may acquire a normal return rate and an erroneous return rate of the sharable personal mobility devices for respective service regions based on position information of the respective sharable personal mobility devices, use state information received from the user terminal 10, and use state information received from the manager terminal 30. The normal return may represent a case in which the sharable personal mobility device is returned in a predetermined service region, and the erroneous return may represent a case in which the sharable personal mobility device is returned in a service region that is not predetermined. The data processor 431 may, when the sharable personal mobility device is positioned in a region that is not a predetermined service region, and is then switched to a return state, the corresponding sharable personal mobility device may be identified to be erroneously returned. The data processor 431 may acquire robbery rates of the sharable personal mobility devices for respective service regions by monitoring position information of the sharable personal mobility devices, and report information received from the user terminal 10 or the manager terminals 30. The data processor 431 may, when the sharable personal mobility device of which the return is completed moves on a path that is not permitted, identify the corresponding sharable personal mobility device as robbed. The data processor 431 may, when the user terminal 10 or the manager terminal 30 reports robbery, identify that the corresponding sharable personal mobility device is robbed.

The data processor 431 may acquire a service region-based report rate based on report information received from the user terminal 10 or the manager terminal 30. The data processor 431 may acquire defect occurrence statuses (whether a defect is generated or not) of the respective sharable personal mobility devices based on the report information transmitted by the user terminal 10 or the manager terminal 30 so as to report generation of defects of the sharable personal mobility device. The data processor 431 may acquire a self-diagnosis history of the respective sharable personal mobility devices based on the history for the user terminal 10 or the manager terminal 30 to request self-diagnosis on the sharable personal mobility device. The management server 40 may receive various VOCs (e.g., VOCs on a service application, a payment, a sharable personal mobility device using method, generation of defects) on the personal mobility sharing service from the user terminal 10 or the manager terminal 30. The management server 40 may transmit reply information that is predetermined corresponding to the received VOC to the user terminal 10 or the manager terminal 30. The management server 40 may connect the counselor terminal 50 to the user terminal 10 or the manager terminal 30 to process the VOC received from the user terminal 10 or the manager terminal 30. The management server 40 may, when a response to the VOC is transmitted to the user terminal 10 or the manager terminal 30 through the counselor terminal 50, receive a response history from the counselor terminal 50. Therefore, the data processor 431 may collect the VOC and the reply information transmitted/received between the user terminal 10 and the management server 40, between the manager terminal 30 and the management server 40, between the user terminal 10 and the counselor terminal 50, or between the manager terminal 30 and the counselor terminal 50, and may acquire a VOC processing history.

The service operating information acquired in this way may be used for the prediction model manager 432 to be described to analyze a service region-based characteristic, analyze types, frequencies of generation, and trends of issues that are generated during providing a service, and thus build and optimize the above-described prediction model.

The prediction model manager 432 may generate the above-described prediction model and may update (optimize) the same. The prediction model manager 432 may generate the prediction model based on information on the user terminals 10, the device terminals 20, and the manager terminals 30, and service operating information managed by the management server 40. The prediction model manager 432 may update (optimize) the prediction model by using a learning method such as machine learning or deep learning. A method for the prediction model manager 432 to manage a prediction model will now be described with reference to FIG. 6.

The predictor 433 may predict a generating possibility on a plurality of predefined issues by applying information received from the user terminals 10 and information received from the device terminals 20 of the sharable personal mobility devices to the prediction model. The issues predicted to be generated through the prediction model need assistance (or a guide), and may include the problem situation such as device defects, or the VOCs generated by the need of the user. A method for the predictor 433 to predict generation of issues by use of a prediction model will now be described with reference to FIG. 7.

The device manager 434 may execute the functions on diagnosis of the sharable personal mobility devices. The device manager 434 may, when receiving a request of self-diagnosis on the sharable personal mobility device from the user terminal 10 or the manager terminal 30, read self-diagnosis guide information on the self-diagnosis-requested item from the guide information DB 426. The device manager 434 may transmit self-diagnosis guide information corresponding to the requested item to the user terminal 10 or the manager terminal 30 having requested self-diagnosis. The device manager 434 may, when receiving a request of remote diagnosis from the user terminal 10 or the manager terminal 30, connect the terminal (the user terminal 10 or the manager terminal 30) having requested remote diagnosis and the counselor terminal 50 through remote diagnosis. The device manager 434 may transmit data between the counselor terminal 50 processing remote diagnosis and the terminal (the user terminal 10 or the manager terminal 30) having requested remote diagnosis while performing remote diagnosis.

The client service provider 435 may, when the predictor 433 predicts generation of a specific issue, read guide information corresponding to the corresponding issue from the guide information DB 426. The client service provider 435 may transmit the read guide information to the corresponding client terminal (the user terminal 10 or the manager terminal 30). The client service provider 435 may, when receiving the VOC from the client terminal (the user terminal 10 or the manager terminal 30), may read guide information corresponding to the received VOC from the guide information DB 426. The client service provider 435 may transmit the read guide information to the client terminal (the user terminal 10 or the manager terminal 30) having received the VOC. The client service provider 435 may, when the client terminal (the user terminal 10 or the manager terminal 30) requests a connection to the counselor for the purpose of receiving the VOC, connect the counselor terminal 50 to the corresponding client terminal.

A method for providing a personal mobility sharing service, in particular, a method for efficiently responding to problem situations or needs of users that may be generated while providing a personal mobility sharing service will now be described in detail with reference to FIG. 6 and FIG. 7.

Figure 6:
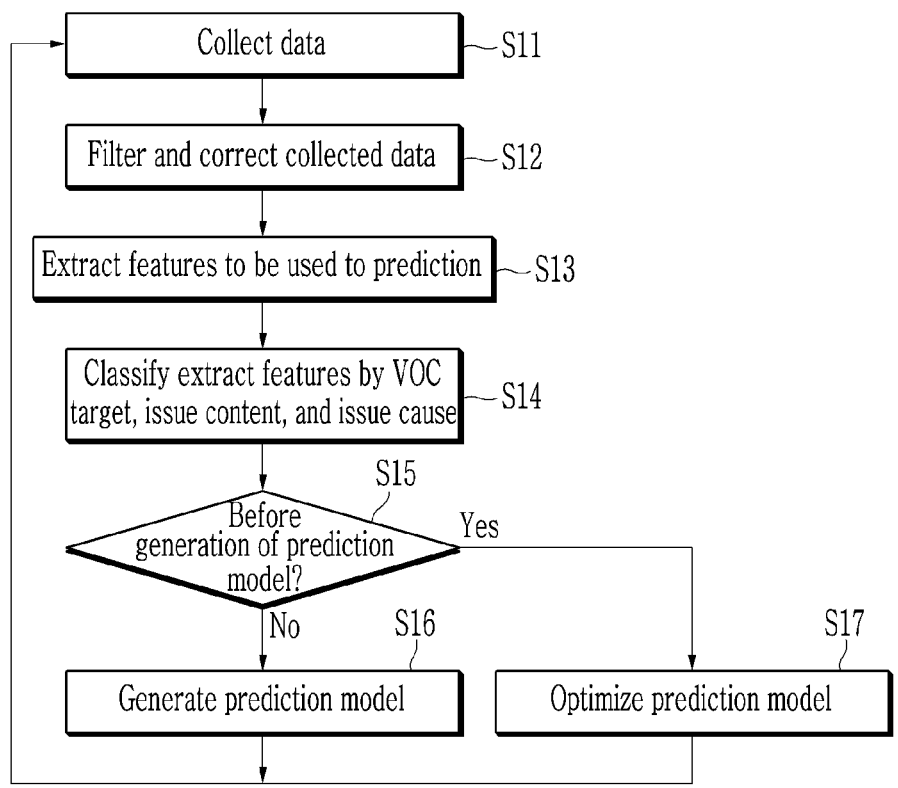
FIG. 6 shows a method for managing a prediction model according to an embodiment.

FIG. 6 shows a method for managing a prediction model according to an embodiment. The method for managing a prediction model of FIG. 6 may be performed by the management server 40 described with reference to FIG. 1 and FIG. 5.

Referring to FIG. 6, the management server 40 may collect data to generate or optimize (update) a prediction model (S11). The management server 40 may collect user information of the user, position information, and use state information of the sharable personal mobility device from the user terminals 10. The management server 40 may collect device state information, device control history, and position information of the sharable personal mobility devices from the device terminals 20. The management server 40 may collect device (sharable personal mobility device) operating information and client service providing information in the service region managed by the management server 40.

The management server 40 may filter and correct the collected data to finally determine data to be used in generation or optimization of the prediction model (S12). The management server 40 may, when the data to be used in generation or optimization of the prediction model are determined, extract features to be used to prediction from the corresponding data (S13). The management server 40 may extract the features to be used for prediction based on difficulties of users or needs (request items, matters for inquiry, etc.) in the viewpoint of using the personal mobility sharing service. The management server 40 may extract the features to be used for prediction based on device defects (not working, overloads, malfunctions, etc.) that may be generated by the sharable personal mobility device, and causes of the defects.

The management server 40 may classify the features extracted in the S13 according to issue targets (e.g., VOC targets, or defect-generated devices), issue contents, issue causes, and issue types (e.g., defect types) (S14).

The management server 40 may generate a prediction model by using the features (S16) classified through the S14 before generating the prediction model (S15). The management server 40 may generate a prediction model by analyzing generation frequencies for respective issue types and generation probabilities from the features classified through S14.

The management server 40 may update (optimize) the prediction model by using the features classified through S14 after generating the prediction model (S17). The management server 40 may continuously optimize the prediction model by repeatedly performing S11 to S14, and S17, after generating the prediction model.

Figure 7:
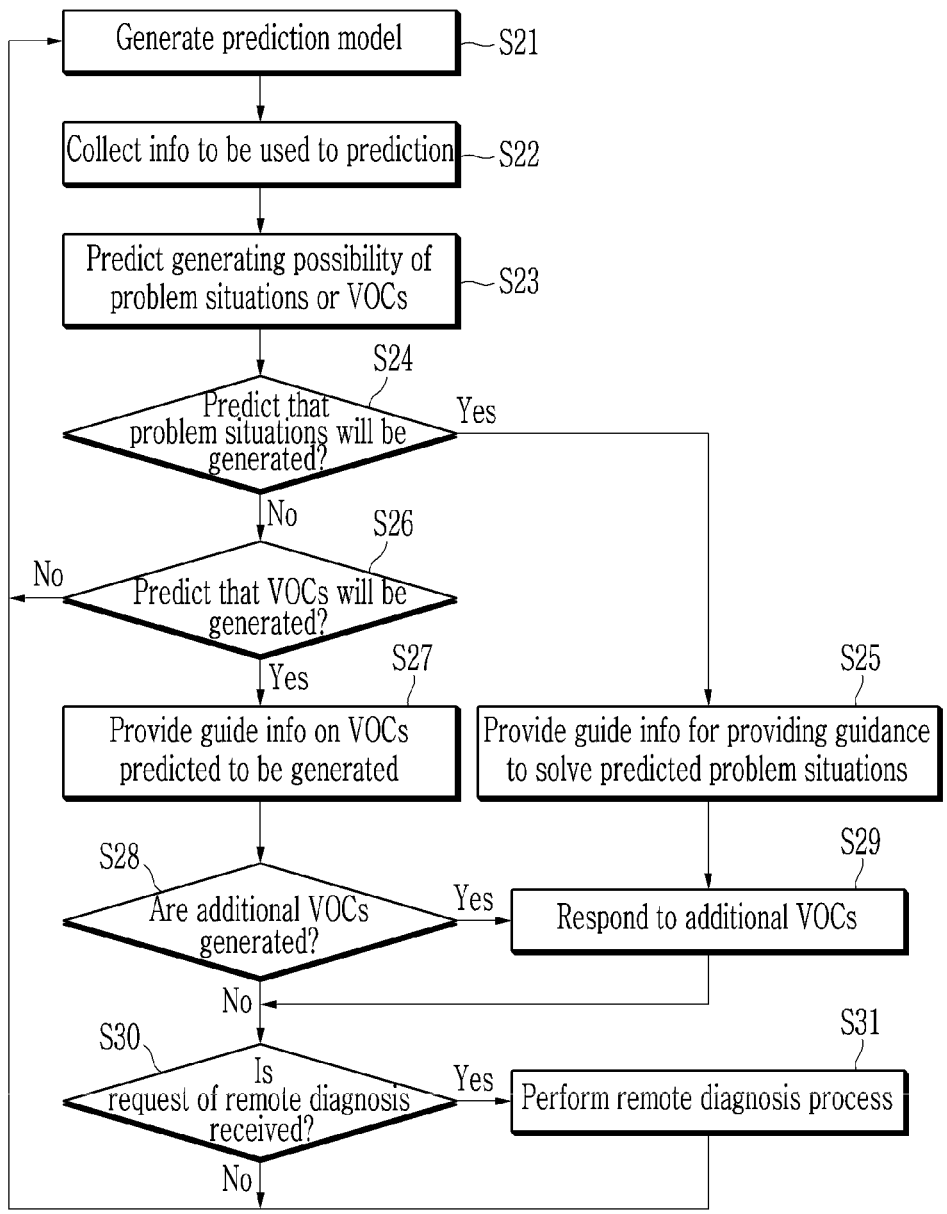
FIG. 7 shows a method for providing a personal mobility sharing service according to an embodiment.

FIG. 7 shows a method for providing a personal mobility sharing service according to an embodiment. The providing method of FIG. 7 may be performed by the management server 40 described with reference to FIG. 1 and FIG. 5.

Referring to FIG. 7, the management server 40 may, when the prediction model is generated by the method described with reference to FIG. 6 (S21), may collect information used to prediction (S22).

In the S22, the management server 40 may, when the user starts using a service use, collect position information of the corresponding user, and use state information of the sharable personal mobility device. The position information of the user may include coordinate information indicating the current location of the user, geographic information (a flatland, an uphill road, a downhill road, etc.) corresponding to the current location of the user, and distance information between the user and the sharable personal mobility device reserved/rented by the user. The use state information of the sharable personal mobility device of the user may include information indicating the use state of the sharable personal mobility device as before rental, during driving, during stoppage, before return, and completion of return. The management server 40 may, when the service application is executed in the user terminal 10 and the user terminal 10 is connected to the management server 40 or reservation information of the personal mobility sharing service is registered to the management server 40 by the user, determine to be that the use of a service by the user has started.

In S22, the management server 40 may collect device state information and device control history information of the sharable personal mobility device. The device state information may include battery state information and driving state information. The device control history information may include information on a power on/off history, a lock/unlock history, a speed change history, a motor torque change history, and a use time of the sharable personal mobility device.

The management server 40 may predict the generating possibility of a plurality of predefined issues, that is, the problem situations or the VOCs by using the data collected through the S22 and the prediction model (S23). That is, the management server 40 may predict the generating possibility of problem situations or VOCs in the present situation (before rental, during driving, during stoppage, before return, completion of return, etc.) of the user, the current location of the user, or the present state of the sharable personal mobility device by inputting the data collected through the S22 to the prediction model. The management server 40 may digitize the generating possibility (or predictability) of respective issues (problem situations or VOCs) by using a prediction model, and when the digitized generating possibility is greater than a predetermined level, it may predict that a corresponding issue will be generated. Therefore, depending on cases, a plurality of issues may be predicted to be generated through the prediction model.

The management server 40 may, when the problem situation is predicted to be generated through S23 (S24), provide guide information for providing guidance to solve the predicted problem situation to the corresponding client terminal (the user terminal 10 or the manager terminal 30) (S25). For example, the management server 40 may, when the problem situation relating to the device defect is predicted to be generated, transmit guide information to the client terminal (the user terminal 10 or the manager terminal 30) renting or storing the sharable personal mobility device to which the corresponding problem situation is predicted to be generated.

The management server 40 may, when the VOC is predicted to be generated through S23 (S26), provide guide information on the VOC predicted to be generated to the client terminal (the user terminal 10 or the manager terminal 30) (S27). That is, the management server 40 may provide the VOC items predicted to be generated, and guide information including reply information thereto to the client terminal (the user terminal 10 or the manager terminal 30) predicted to generate a corresponding VOC.

The management server 40 may, after transmitting the guide information, check whether an additional VOC is generated by the client terminal (the user terminal 10 or the manager terminal 30) having received the guide information (S28). The management server 40 may, when the additional VOC is generated, perform a process corresponding to the generated additional VOC (S29). That is, the management server 40 may transmit the guide information corresponding to the additional VOC to the client terminal (the user terminal 10 or the manager terminal 30) having generated the additional VOC, or may connect the counselor terminal 50 and the corresponding client terminal for the purpose of correspondence.

The management server 40 may, after transmitting the guide information, check whether a request of remote diagnosis is received from the client terminal (the user terminal 10 or the manager terminal 30) (S30). The management server 40 may, when receiving the request of remote diagnosis from the client terminal, perform a remote diagnosis process corresponding to the same (S31). That is, the management server 40 may connect the client terminal having requested remote diagnosis and the counselor terminal 50 for the purpose of remote diagnosis, and may then transmit the data transmitted/received between the two terminals.

The management server 40 may continuously predict the generation of problem situations or VOCs and may respond to the same by repeatedly performing S22 to S31.

Figure 8A:
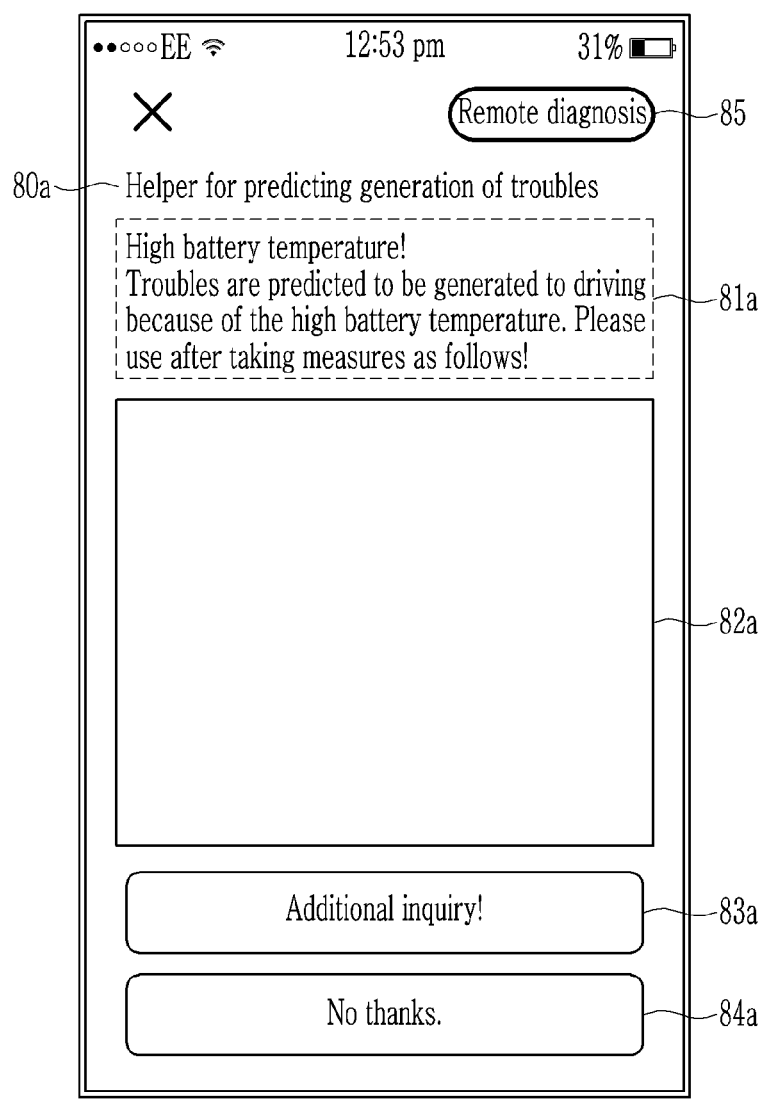
FIG. 8A to FIG. 8C show examples for a client terminal of a system for providing a personal mobility sharing service according to an embodiment to provide a UI for responding in real time to an issue predicted by a management server.
Figure 8B:
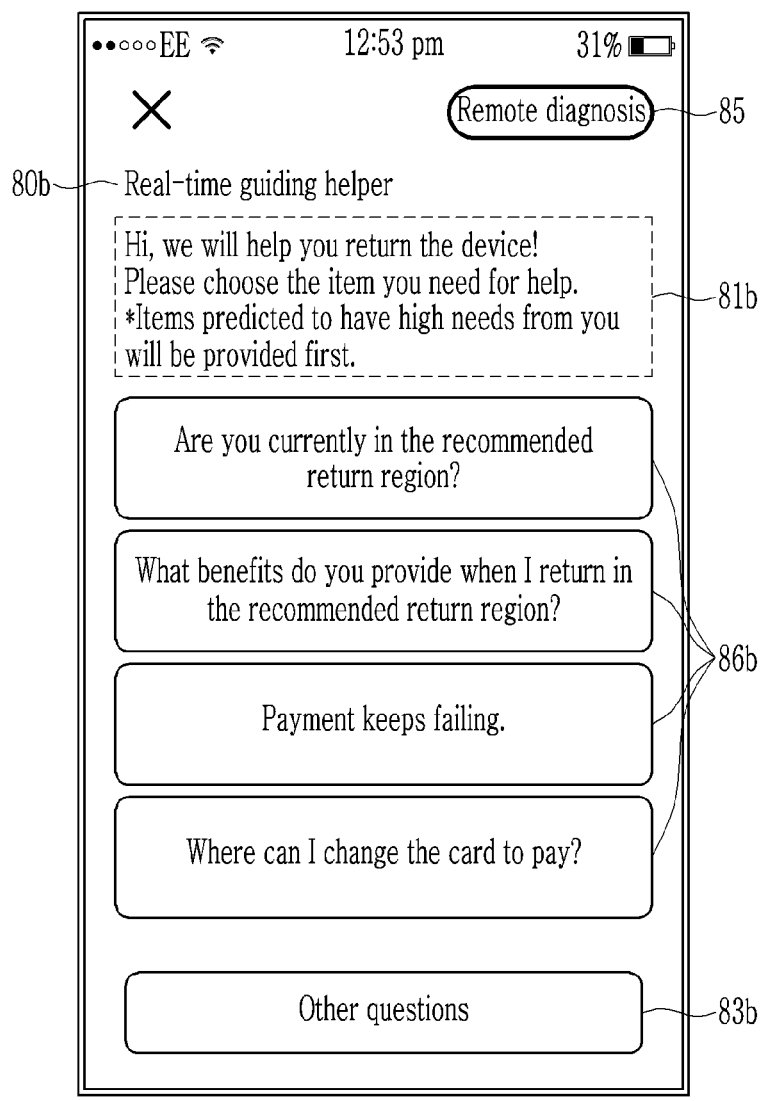
Figure 8C:
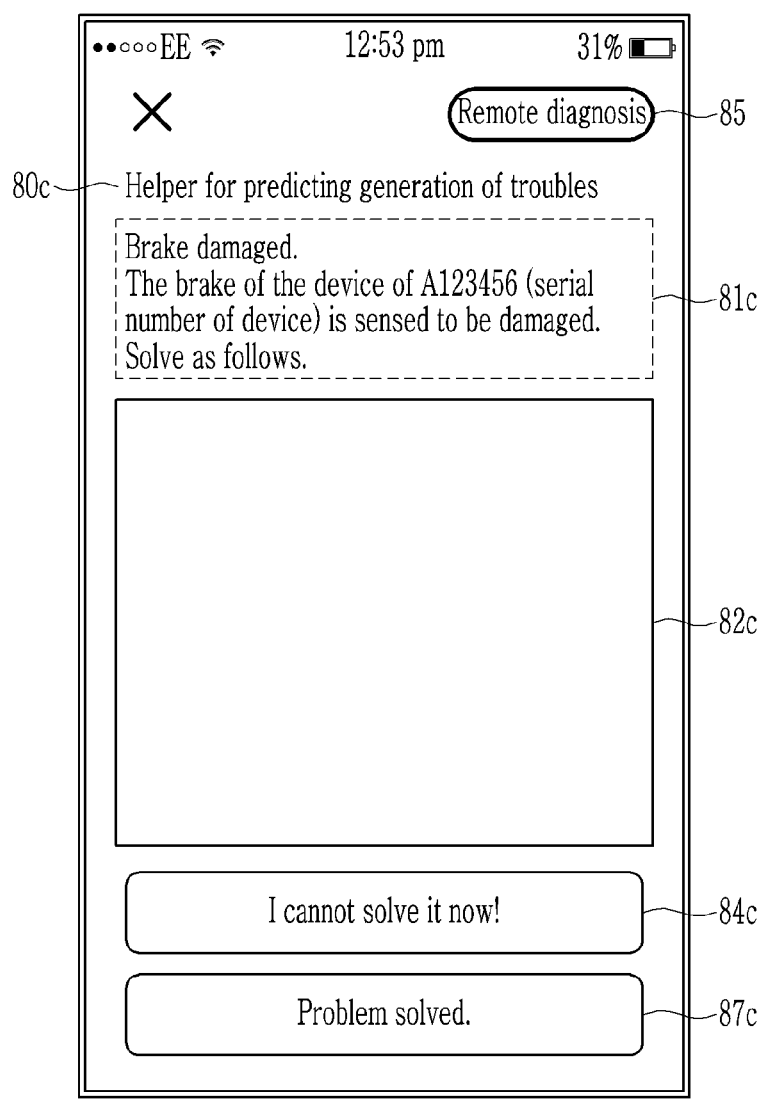

FIG. 8A to FIG. 8C show examples of providing a UI for the client terminal to respond in real time to the issues predicted by the management server 40. FIG. 8A and FIG. 8B show examples of a UI provided by the user terminal 10, and FIG. 8C shows an example provided by the manager terminal 30.

The user terminal 10 or the manager terminal 30 may, when the issue predicted to be generated by the management server 40 is a problem situation relating to the device defect, display helper UIs 80a and 80c for predicting generation of trouble, as shown in FIG. 8A and FIG. 8C. The helper UIs 80a and 80c for predicting generation of trouble provides guidance to the problem situation predicted to be generated in the near future, and may include graphic objects (e.g., text 81a and 81c, and image/video 82a and 82c) for providing a solution guide for addressing trouble.

When the issue predicted to be generated by the management server 40 is the VOC caused by the needs of the client, the user terminal 10 may display a real time guidance helper UI 80b as shown in FIG. 8B. The real time guidance helper UI 80b may include at least one VOC item 86b selected in high order of predictability, that is, a generating possibility from among the VOC items predicted to be generated in the near future. The user terminal 10 may, when one of the VOC items 86b is selected, additionally display guide information (e.g., reply information) on the selected VOC item 86b to the screen.

The user terminal 10 or the manager terminal 30 may additionally display a selection button 85 (e.g., a touch button) for additionally requesting remote diagnosis on the screen. The user terminal 10 or the manager terminal 30 may additionally display selection buttons 83a and 83b for requesting an additional VOC, selection buttons 84a and 84c for postponing solution of a problem situation, and a selection button 87c for notifying the management server 40 that the trouble is solved.

FIG. 9A and FIG. 9B show a method for the management server 40 to process remote diagnosis in the viewpoint of the UI of the client terminal.

Referring to FIG. 9A, the client terminal (the user terminal 10 or the manager terminal 30) may, while the UI for responding to the problem situation or the VOC predicted by the management server 40 is displayed (S41), receive a request of remote diagnosis from the user or the manager. That is, the client terminal (the user terminal 10 or the manager terminal 30) may, as the selection button 85 for requesting remote diagnosis is selected by the user or the manager, recognize as that a user input for request remote diagnosis is generated.

A process for agreeing to terms and conditions for setting rights of the counselor may be needed to progress remote diagnosis. For this purpose, the client terminal (the user terminal 10 or the manager terminal 30) may display the UI 91 for the agreement process to the terms and conditions on the screen (S42), and may receive agreement information from the user or the manager.

When receiving agreement information from the user or the manager, the client terminal (the user terminal 10 or the manager terminal 30) may transmit the agreement information to the management server 40. Accordingly, a one-time access code for remote diagnosis may be transmitted to the corresponding client terminal (the user terminal 10 or the manager terminal 30) from the management server 40 or the counselor terminal 50.

When receiving the access code, the client terminal (the user terminal 10 or the manager terminal 30) may display the UI 92 for inputting the access code (S43), and may then receive the access code from the user or the manager. When the access code is input by the user or the manager, the client terminal (the user terminal 10 or the manager terminal 30) may transmit a request of remote diagnosis together with the input access code to the management server 40 (or the counselor terminal 50). Upon receiving this, the management server 40 (or the counselor terminal 50) may verify validity of the access code, and when the validity is successfully verified, it may connect the counselor terminal 50 of the counselor who will progress remote counseling and the client terminal (the user terminal 10 or the manager terminal 30) having requested remote diagnosis (S44).

The client terminal (the user terminal 10 or the manager terminal 30) may, when successfully connected to the counselor terminal 50, execute a remote mode. When the remote mode is executed, the client terminal (the user terminal 10 or the manager terminal 30) may operate his cameras 16 and 36. The client terminal (the user terminal 10 or the manager terminal 30) may share image data photographed through the cameras 16 and 36 with the counselor terminal 50.

Referring to FIG. 9B, as the remote mode is performed, the client terminal (the user terminal 10 or the manager terminal 30) may display the UI 93 for remote diagnosis to the screen (S45). The client terminal (the user terminal 10 or the manager terminal 30) may, as the remote diagnosis is progressed, receive information (diagnosis content, action content, etc.) on remote diagnosis from the counselor terminal 50, and may display received information to the screen (S46). For example with reference to FIG. 9B, the remote diagnosis UI 93 may include images 94a and 94b photographed through the cameras 16 and 36 of the client terminal (the user terminal 10 or the manager terminal 30), and communication regions 95a and 95b for transmitting/receiving messages to/from the counselor in real time. The remote diagnosis UI 93 may further include a diagnosis history 97 including action details of the counselor as the remote diagnosis is progressed.

The remote diagnosis UI 93 may further include a selection button 96 for selecting remote termination. The user or the manager may, when attempting to terminate the remote diagnosis, select the remote termination button 96 and may request remote diagnosis termination from the counselor terminal 50. The counselor terminal 5 may terminate a remote right of the counselor and may lift the connection to the corresponding client terminal (the user terminal 10 or the manager terminal 30).

FIG. 10 shows examples for the management server 40 to provide information on the predicted VOC.

When the client terminal (the user terminal 10 or the manager terminal 30) is not executing an application (a service application or a management application), the management server 40 may use messages 101a and 101b such as an application push message, an instant message, and a text message to provide guide information on the predicted problem situations or VOCs to the client terminal.

Conventionally, the user using a personal mobility sharing service sends the VOC to a client center for providing a corresponding service on the problem situations or requirements generated when he uses the sharable personal mobility device, and solves the same. However, the above-noted trouble solving method has a difficulty in that the service provider responds in real time to the VOCs of users as the users of the personal mobility sharing service steeply increase, and efficiency of the service operation is lowered.

To solve the problem, in the above-described embodiments, the possibility that the problem situation or the VOC may be generated within a predetermined time is predicted depending on the present situation of the user and the current location, or the current state of the sharable personal mobility device. Regarding the problem situation or the VOC predicted to be generated, a solution guide is automatically provided to the terminal of the client so that the client (the user terminal 10 or the manager terminal 30) may solve the problem without directly asking the client center. When the predicted problem situation relates to a device defect, a self-diagnosis guide is automatically provided to the terminal of the corresponding client so that the client (the user or the manager) may solve the drawback through simple self-diagnosis. If needed, a customized UI is provided so that the user or the manager may send an additional VOC or may request remote diagnosis to receive a real-time client receiving service.

According to the embodiments, the service provider providing the personal mobility sharing service may deduce the effect of efficiently operating the service by minimizing the sending of a VOC from the client (the user or the manager). Further, the user or the manager may solve simple device defects through simple self-diagnosis, so there may be no need to call the client center or visit the same.

The above-described method for providing a personal mobility sharing service according to an embodiment may be performed by using hardware and/or software. When executed through software, code segments are configured to perform necessary tasks. The program or the code segments may be stored in a processor readable function medium or may be transmitted by a transmission medium or a computer data signal combined to a carrier wave in a communication network.

Computer-readable recording media include all types of recording apparatuses in which data readable by a computer system are stored. Examples of the computer-readable recording devices include a ROM, a RAM, a CD-ROM, a DVD_ROM, a DVD_RAM, a magnetic tape, a floppy disk, a hard disk drive, and an optical data storage device. Further, the computer-readable recording media may be distributed to a computer device connected by a network, and computer-readable codes may be stored and performed in a distributed fashion.

The accompanying drawings and the exemplary embodiments of the present disclosure are only examples of the present disclosure, and are used to describe the present disclosure but do not limit the scope of the present disclosure as defined by the following claims. Therefore, those having ordinary skill in the art will appreciate that various modifications or changes and other equivalent embodiments are possible from the exemplary embodiments. Further, a person of ordinary skill in the art may omit some of the constituent elements described in the specification without deterioration of performance or may add constituent elements for better performance. In addition, a person of ordinary skill in the art may change the specifications depending on the process conditions or equipment. Hence, the range of the present disclosure is to be determined by the claims and equivalents.

What is claimed is:

1. A server for providing a personal mobility sharing service, comprising:
    a communication device configured to communicate with device terminals mounted on personal mobility devices managed by the server and user terminals of users using the personal mobility sharing services; and
    a control device configured to:
    acquire device state information on the personal mobility devices through the device terminals;
    acquire use state information of respective users on the personal mobility devices through the user terminals;
    predict generation of at least one voice of customer (VOC) by a first user is based on the use state information and the device state information;
    transmit first guide information on the at least one VOC to a first user terminal of the first user; and
    in response to a request for remote diagnosis received from the first user terminal, connect the first user terminal to a counselor terminal and transmit remote diagnosis data between the first user terminal and the counselor terminal.

2. The server of claim 1, wherein the first guide information includes the at least one VOC and reply information corresponding to the at least one VOC.

3. The server of claim 1, wherein the control device is further configured to, when generation of a problem situation relating to a second user is predicted based on the use state information and the device state information, transmit second guide information on the problem situation to a second user terminal of the second user.

4. The server of claim 3, wherein the second guide information includes information for providing guidance to solve the problem situation.

5. The server of claim 4, wherein when the problem situation corresponds to a device defect of a first personal mobility device rented by the second user, the guide information includes self-diagnosis guide information on the device defect.

6. The server of claim 1, wherein:
    the communication device is further configured to communicate with a manager terminal of a manager managing the personal mobility devices, and
    the control device is further configured to, when generation of a problem situation relating to a device defect of a second personal mobility device managed by the manager is predicted based on the device state information, transmit third guide information including self-diagnosis guide information on the device defect to the manager terminal.

7. The server of claim 1, further comprising:
    a storage device for storing a prediction model for predicting a possibility that a plurality of predefined issues may be generated within a predetermined time,
    wherein the control device is further configured to generate the prediction model based on the use state information, the device state information, and service operating information, and predict a generating possibility of a VOC of the first user by using the prediction model, and
    the service operating information includes at least one of a service region-based normal return rate, a service region-based erroneous return rate, a service region-based robbery rate, a service region-based report rate of generation of trouble of the personal mobility devices, a rental history of the personal mobility devices, a defect occurrence status of the personal mobility devices, or a VOC processing history on the personal mobility sharing service.

8. The server of claim 7, wherein:
    the control device is further configured to acquire device control history information of the respective personal mobility devices through the device terminals, and predict a generating possibility of the VOC of the first user by applying the use state information, the device state information, and the device control history to the prediction model, and
    the device control history information includes at least one of a power control history, a locked state controlling history, a speed change history, a motor torque change history, or a use time of a corresponding personal mobility device.

9. The server of claim 7, wherein the control device is further configured to acquire geographic information corresponding to positions of respective users based on position information received from the user terminals and the device terminals or distance information between personal mobility devices corresponding to the respective users, and predict a generating possibility of a VOC of the first user by applying the use state information and the device state information, and the geographic information or the distance information to the prediction model.

10. The server of claim 1, wherein the control device is further configured to, when transmitting the first guide information and then receiving an additional VOC from the first user terminal, transmit reply information corresponding to the additional VOC to the first user terminal.

11. The server of claim 1, wherein:
at least one sensor is positioned on the respective personal mobility devices,
the control device is configured to respectively receive the device state information acquired through the at least one sensor from the device terminals, and
the device state information includes at least one of a voltage, a temperature, and a charged amount of a battery mounted on a corresponding personal mobility device, a temperature, a torque, and an overload of a motor mounted on the corresponding personal mobility device, and a current gear end position, a brake state, or a moving speed of the corresponding personal mobility.

12. The server of claim 1, wherein the use state information indicates a use state of a corresponding user on a personal mobility device as one of before rental, during driving, during stoppage, before return, or completion of return.

13. A method for a server for providing a personal mobility sharing service to provide a service, comprising:
acquiring device state information of personal mobility devices through device terminals mounted on the personal mobility devices managed by the server;
acquiring use state information of respective users on the personal mobility devices through user terminals of users using the personal mobility sharing service;
predicting generation of at least one voice of customer (VOC) by a first user based on the use state information and the device state information;
transmitting first guide information on the at least one VOC to a first user terminal of the first user; and
in response to a request for remote diagnosis received from the first user terminal, connecting the first user terminal to a counselor terminal and transmitting remote diagnosis data between the first user terminal and the counselor terminal.

14. The method of claim 13, further comprising,
when generation of a problem situation relating to a second user is predicted based on the use state information and the device state information, transmitting second guide information on the problem situation to a second user terminal of the second user.

15. The method of claim 13, further comprising, when generation of a problem situation relating to a device defect of a second personal mobility device managed by a manager is predicted based on the device state information, transmitting third guide information including self-diagnosis guide information on the device defect to the manager terminal.

16. The method of claim 13, further comprising:
building a prediction model for predicting generation of a problem situation or a VOC relating to the personal mobility sharing service based on the use state information, the device state information, and service operating information, and
predicting a generating possibility of the VOC of the first user by using the prediction model,
wherein the service operating information includes at least one of a service region-based normal return rate, a service region-based erroneous return rate, a service region-based robbery rate, a service region-based report rate of generation of trouble of the personal mobility devices, a rental history of the personal mobility devices, a defect occurrence status of the personal mobility devices, or a VOC processing history relating to the personal mobility sharing service.

17. The method of claim 13, further comprising,
after the transmitting of first guide information, receiving an additional VOC from the first user terminal, and
transmitting reply information corresponding to the additional VOC to the first user terminal.

18. The method of claim 13, wherein the acquiring of device state information includes:
receiving the device state information acquired by at least one sensor position on respective personal mobility devices from the device terminals; and
the device state information includes at least one of a voltage, a temperature, and a charged amount of a battery mounted on a corresponding personal mobility device, a temperature, a torque, and an overload of a motor mounted on the corresponding personal mobility device, and a present gear end position, a brake state, or a moving speed of the corresponding personal mobility device.

\* \* \* \* \*